(12) United States Patent
Soga et al.

(10) Patent No.: US 8,809,437 B2
(45) Date of Patent: Aug. 19, 2014

(54) METHOD OF MANUFACTURING NANOPARTICLE DISPERSION LIQUID

(75) Inventors: Kohei Soga, Tokyo (JP); Hiroshi Hyodo, Tokyo (JP)

(73) Assignee: Tokyo University of Science Foundation, Tokyo (JP)

( * ) Notice: Subject to any disclaimer, the term of this patent is extended or adjusted under 35 U.S.C. 154(b) by 0 days.

(21) Appl. No.: 14/002,984

(22) PCT Filed: Mar. 3, 2011

(86) PCT No.: PCT/JP2011/054976
§ 371 (c)(1),
(2), (4) Date: Sep. 3, 2013

(87) PCT Pub. No.: WO2012/117562
PCT Pub. Date: Sep. 7, 2012

(65) Prior Publication Data
US 2013/0338304 A1    Dec. 19, 2013

(51) Int. Cl.
*C08K 3/22* (2006.01)
*C01F 17/00* (2006.01)
*C08L 53/00* (2006.01)
*B01F 17/00* (2006.01)

(52) U.S. Cl.
CPC .......... *C08L 53/005* (2013.01); *C01F 17/0056* (2013.01); *C01P 2002/54* (2013.01); *B01F 17/0028* (2013.01); *C01P 2004/64* (2013.01); *C01F 17/0068* (2013.01); *C01P 2006/22* (2013.01)
USPC ........................................................ 524/430

(58) Field of Classification Search
USPC ........................................................ 524/430
See application file for complete search history.

(56) References Cited

FOREIGN PATENT DOCUMENTS

| JP | 2006249254 A | 9/2006 |
|---|---|---|
| JP | 2009138081 A | 6/2009 |
| JP | 2010112861 A | 5/2010 |

OTHER PUBLICATIONS

Soga et al., Journal of Physics Conference Series 191 (2009).
International Preliminary Report on Patentability for PCT/JP2011/054976 dated Dec. 4, 2012.

*Primary Examiner* — Peter Szekely
(74) *Attorney, Agent, or Firm* — Marshall, Gerstein & Borun LLP (57) ABSTRACT

The present invention provides a method of producing a nanoparticle dispersion liquid, including: altering a surface of a nanoparticle in the presence of an ion by contacting a complex that includes the nanoparticle and a solid material present around the nanoparticle with a surface altering agent-containing liquid, that includes a surface altering agent for altering the surface of the nanoparticle and a solvent for dissolving the solid material and that has a viscosity of 1.10 mPa·s or more at 25° C.; and a dispersing step of dispersing the surface-altered nanoparticle in the solvent.

14 Claims, 5 Drawing Sheets

METHOD OF MANUFACTURING NANOPARTICLE DISPERSION LIQUID

TECHNICAL FIELD

The present invention relates to a method of producing a nanoparticle dispersion liquid.

BACKGROUND ART

So-called nanoparticles having an average particle size of less than 1 μm and nanoparticle dispersion liquids containing the nanoparticles dispersed therein have been subjected to various studies in various fields such as the fields of biotechnology, genetic engineering, immunology, medical treatment, environment, and electronic devices.

For example, a dispersion liquid which includes an LnOX (Ln represents a rare earth element and X represents a halogen element) nanoparticle having an average particle size of from one to 800 nm dispersed in a solvent having a high salt concentration (for example, see Japanese Patent Application Laid-Open (JP-A) No. 2009-138081) has been known.

A dispersion liquid which includes a Y2O3 nanoparticle dispersed in a K3PO4-containing solvent (for example, see Journal of Physics: Conference Series 191 (2009): 012003-1-012003-7) has been also known.

SUMMARY OF INVENTION

Nanoparticles have a tendency to easily aggregate to each other due to their great surface energy or the like. Particularly, aggregation of nanoparticles tends to cause in an ion-containing liquid.

As a method of dispersing nanoparticles in a solvent, there is a method in which a surface of the nanoparticle is modified with a surface altering agent to disperse the surface-modified nanoparticles in the solvent.

However, in an ion-containing liquid, nanoparticles can aggregate before the surface thereof is modified with a surface altering agent, consequently making it difficult to disperse the nanoparticles in the liquid.

Accordingly, it is an object of the present invention to provide a method of producing a nanoparticle dispersion liquid that enables dispersing a nanoparticle while suppressing aggregation of the nanoparticle even in the presence of an ion, thereby providing a nanoparticle dispersion liquid in which dispersed particle size is small.

Specific means for solving the above-described problem are as follows:

<1> A method of producing a nanoparticle dispersion liquid, comprising: altering a surface of a nanoparticle in the presence of an ion by contacting a complex that includes the nanoparticle and a solid material present around the nanoparticle with a surface altering agent-containing liquid, that includes a surface altering agent for altering the surface of the nanoparticle and a solvent for dissolving the solid material and that has a viscosity of 1.10 mPa·s or more at 25° C.; and a dispersing step of dispersing the surface-altered nanoparticle in the solvent.

<2> The method of producing a nanoparticle dispersion liquid according to <1>, wherein: the solid material is a metal salt; the solvent is water; the ion is a metal ion generated by dissolution of the metal salt; and the surface altering agent is a polymer dispersant that alters the surface of the nanoparticle by modifying the surface of the nanoparticle.

<3> The method of producing a nanoparticle dispersion liquid according to <1>, wherein: the nanoparticle is a ceramic nanoparticle; the solid material is a metal salt; the solvent is water; the ion is a metal ion generated by dissolution of the metal salt; and the surface altering agent is a polymer dispersant that alters a surface of the ceramic nanoparticle by modifying the surface of the ceramic nanoparticle.

<4> The method of producing a nanoparticle dispersion liquid according to <1>, wherein a viscosity of the surface altering agent-containing liquid at 25° C. is from 1.10 mPa·s to 40 mPa·s.

<5> The method of producing a nanoparticle dispersion liquid according to <2>, wherein a viscosity of the surface altering agent-containing liquid at 25° C. is from 1.10 mPa·s to 40 mPa·s.

<6> The method of producing a nanoparticle dispersion liquid according to <3>, wherein a viscosity of the surface altering agent-containing liquid at 25° C. is from 1.10 mPa·s to 40 mPa·s.

<7> The method of producing a nanoparticle dispersion liquid according to <1>, wherein the surface altering agent-containing liquid further includes a thickener.

<8> The method of producing a nanoparticle dispersion liquid according to <2>, wherein the surface altering agent-containing liquid further includes a thickener.

<9> The method of producing a nanoparticle dispersion liquid according to <3>, wherein the surface altering agent-containing liquid further includes a thickener.

<10> The method of producing a nanoparticle dispersion liquid according to <2>, wherein the polymer dispersant is a polymer dispersant that includes, in one molecule thereof, an adsorption site for adsorption onto the surface of the nanoparticle and a steric repulsion site.

<11> The method of producing a nanoparticle dispersion liquid according to <3>, wherein the polymer dispersant is a polymer dispersant that includes, in one molecule thereof, an adsorption site for adsorption onto the surface of the nanoparticle and a steric repulsion site.

<12> The method of producing a nanoparticle dispersion liquid according to <2>, wherein the polymer dispersant includes, in one molecule thereof, a poly(meth)acrylic acid site as an adsorption site for adsorption onto the surface of the nanoparticle and a polyethylene glycol site as a steric repulsion site.

<13> The method of producing a nanoparticle dispersion liquid according to <3>, wherein the polymer dispersant includes, in one molecule thereof, a poly(meth)acrylic acid site as an adsorption site for adsorption onto the surface of the ceramic nanoparticle and a polyethylene glycol site as a steric repulsion site.

<14> The method of producing a nanoparticle dispersion liquid according to <1>, wherein: the nanoparticle is a rare earth oxychloride nanoparticle or a rare earth oxide nanoparticle; the solid material is a rare earth salt; the solvent is water; the ion is a rare earth ion generated by dissolution of the rare earth salt; the surface altering agent is a polymer dispersant that includes, in one molecule thereof, a poly(meth)acryl acid site and a polyethylene glycol site and that alters the surface of the nanoparticle by modifying the surface of the nanoparticle; and the surface altering agent-containing liquid further includes polyethylene glycol.

Advantageous Effects

The present invention can provide a method of producing a nanoparticle dispersion liquid that enables dispersing nanoparticles while suppressing aggregation of the nanoparticle even in the presence of an ion, thereby providing a nanoparticle dispersion liquid in which dispersed particle size is small.

DESCRIPTION OF EMBODIMENTS

A method of producing a nanoparticle dispersion liquid according to the present invention is a method of producing a nanoparticle dispersion liquid, including altering a surface of a nanoparticle with a surface altering agent in the presence of an ion by contacting a complex that includes the nanoparticle and a solid material present around the nanoparticle with a surface altering agent-containing liquid that includes a surface altering agent for altering the surface of the nanoparticle and a solvent for dissolving the solid material and has a viscosity of 1.10 mPa·s or more at 25° C. to and a dispersing step to disperse the surface-altered nanoparticle in the solvent.

The present production method enables dispersing a nanoparticle while suppressing aggregation of the nanoparticle even in the presence of an ion, thereby providing a nanoparticle dispersion liquid in which dispersed particle size is small.

The reason that the above advantageous effect is obtainable is thought to be as follows, but the present invention is not limited by the following reason.

As a method of allowing nanoparticles to be present in a liquid while suppressing aggregation between the nanoparticles, there is a method in which a complex including nanoparticles and a solid material present around the nanoparticle is contacted with a liquid for dissolving the solid material to dissolve the solid material in the liquid. Since the complex has a structure in which the nanoparticles are isolated from each other by the solid material, this method allows the nanoparticles to be present in the liquid while suppressing the aggregation between the nanoparticles.

In addition, as a method of obtaining a nanoparticle dispersion liquid in which a nanoparticle is dispersed in a liquid, there is a method in which a surface of the nanoparticle is altered with a surface altering agent (for example, the surface of the nanoparticle is altered by modifying the surface of the nanoparticle with a polymer dispersant as the surface altering agent) to disperse the surface-altered nanoparticle in a solvent.

However, in an ion-containing liquid, aggregation of nanoparticles particularly easily occurs. The reason thereof is thought to be that an ion contained in a liquid erases electric charge on a surface of the nanoparticles, thereby reducing the electrostatic repulsion force between the nanoparticles.

Accordingly, in a case in which a liquid contains an ion, even when attempt is made to form nanoparticles in the liquid by using the complex and alter a surface of the formed nanoparticles with a surface altering agent, aggregation between the nanoparticles tends to occur before the surface thereof is altered with the surface altering agent. As a result, instead of the surface alteration of the nanoparticles, a surface alteration of a nanoparticle aggregate mainly occurs, whereby the resulting dispersed particle size tends to be large.

Thus, the method of producing a nanoparticle dispersion liquid of the present invention uses a surface altering agent-containing liquid having a viscosity of 1.10 mPa·s or more at 25° C. Movement of nanoparticles in the liquid can be restricted thereby. Therefore, even in the presence of an ion, the surface of the nanoparticles can be altered before aggregation between the nanoparticles occurs, whereby the surface-altered nanoparticles are dispersed in the solvent.

Due to the reason as described above, it is thought that the method of producing a nanoparticle dispersion liquid of the present invention enables dispersing a nanoparticle even in the presence of an ion while suppressing aggregation of the nanoparticle, whereby a nanoparticle dispersion liquid in which dispersed particle size is small can be obtained.

In the method of producing a nanoparticle dispersion liquid of the present invention, a dispersing treatment in the dispersing step is performed in the presence of an ion (at least one of a cation and an anion).

The ion used herein refers to at least one of an ion generated by dissolution of the solid material and an ion included in the surface altering agent-containing liquid.

In addition, in the method of producing a nanoparticle dispersion liquid of the present invention, it is sufficient from the viewpoint of suppressing the aggregation between nanoparticles that the viscosity of the surface altering agent-containing liquid at 25° C. is 1.10 mPa·s or more, and there is no particular limitation on an upper limit of the viscosity thereof.

However, from the viewpoint of more effectively moves the surface altering agent onto the nanoparticle surface (and eventually surface alteration of the nanoparticle with the surface altering agent) and others, the viscosity of the surface altering agent-containing liquid at 25° C. is preferably 1000 mPa·s or less.

Accordingly, the viscosity of the surface altering agent-containing liquid at 25° C. is preferably from 1.10 mPa·s to 1000 mPa·s.

The viscosity of the surface altering agent-containing liquid at 25° C. is more preferably from 1.10 mPa·s to 100 mPa·s, still more preferably from 1.10 mPa·s to 50 mPa·s, further preferably from 1.10 mPa·s to 40 mPa·s, and particularly preferably from 1.10 mPa·s to 35 mPa·s.

A dispersion temperature (a temperature of the surface altering agent-containing liquid after the contacting) in the dispersing step is not particularly limited. However, from the viewpoint of further restricting the movement of the nanoparticles, the dispersion temperature is preferably from 4° C. to 90° C.

Particularly, in a case of using water as the solvent, the dispersing temperature (the temperature of the surface altering agent after the contacting) in the dispersing step is preferably from 4° C. to 90° C., and more preferably from 10° C. to 60° C.

In addition, in the dispersing step, a method of dispersing the surface-altered nanoparticle in the solvent is not particularly limited and can be an ordinary method such as stirring.

In other words, the present production method can provide a nanoparticle dispersion liquid in which dispersed particle size is small, without performing typically required ultrasonic dispersing or mechanical dispersing (such as dispersing by ball mill).

The method of producing a nanoparticle dispersion liquid of the present invention may include astep other than the dispersing step as needed.

Examples of such other step include: an additional dispersing step of performing a further dispersing treatment with changing dispersing conditions after the above dispersing step; a redispersing step of performing a redispersing treatment after storing the nanoparticle dispersion liquid obtained in the dispersing step; a step of producing the complex performed before the dispersing step; and a step of preparing the surface altering agent-containing liquid performed before the dispersing step.

Each component used in the production method of the present invention will be described below.

Complex

The complex in the present invention includes a nanoparticle and a solid material present around the nanoparticle.

The shape of the complex is not particularly limited and the complex may be in a form of a particle or in a form of an aggregate.

In addition, a single complex may include only one nanoparticle or two or more nanoparticles.

Hereinbelow, a particulate complex may be referred to as a "complex particle", and an aggregate complex may be referred to simply as a "complex aggregate".

The amount of the complex in the present invention is not particularly limited, but for example, is set to from 0.5 to 10.0% by mass (preferably from 0.5 to 5.0% by mass) with respect to a total amount of the complex and the surface altering agent-containing liquid.

Specific embodiments of the complex will be described below.

(Nanoparticle)

The nanoparticle used in the present invention is a nanoparticle having an average particle size of less than 1 μm (preferably from one to 800 nm).

The average particle size of the nanoparticle is preferably from one to 200 nm from the viewpoint of more effectively obtaining the effect of suppressing the aggregation by the present invention.

As used herein, the average particle size means a value obtained by averaging respective particle sizes of 100 nanoparticles extracted from an electron micrograph of a scanning electron microscope (SEM), a transmission electron microscope (TEM), or the like.

In addition, as the nanoparticle, a nanoparticle slightly soluble in a solvent (such as water) used in the dispersing step can be used.

As used herein, the term "slightly soluble" means a solubility of less than 1 part by mass with respect to 100 parts by mass of a solvent (25° C.).

The nanoparticle may be an organic nanoparticle or inorganic nanoparticle.

However, from the viewpoint of more effectively obtaining the effect of the aggregation suppression in the presence of an ion, preferred is a nanoparticle that can retain electric charge on a surface thereof. Specifically, more preferred are a ceramic nanoparticle (such as a metal oxide nanoparticle, a metal oxychloride nanoparticle, a metal halide nanoparticle, or a metal oxyhalide nanoparticle), a semiconductor nanoparticle (such as a CdS nanoparticle, an Si nanoparticle, or a Ge nanoparticle), and a metal nanoparticle (such as a gold nanoparticle or a platinum nanoparticle), and particularly preferred are a ceramic nanoparticle (such as a metal oxide nanoparticle, a metal oxychloride nanoparticle, a metal halide nanoparticle, or a metal oxyhalide nanoparticle).

In addition, from the viewpoint of using the nanoparticle dispersion liquid in the present invention as a dispersion liquid of rare earth-doped ceramic nanophosphor (REDCNP) for bioimaging, the nanoparticle used in the present invention is preferably a rare earth oxychloride nanoparticle or a rare earth oxide nanoparticle.

As a rare earth oxychloride in the rare earth oxychloride nanoparticle, LnOX (Ln represents a rare earth element and X represents a halogen) is particularly preferable.

As used herein, examples of Ln (rare earth element) applicable include lanthanum (La), erbium (Er), holmium (Ho), praseodymium (Pr), thulium (Tm), neodymium (Nd), gadolinium (Gd), europium (Eu), ytterbium (Yb), samarium (Sm), and cerium (Ce). Any one of these may be used alone or two or more thereof may be used in combination.

The rare earth element (Ln) can be selected in accordance with required characteristics and the like from those mentioned above. For example, as in LnaLnbOX (Lna represents a rare earth element and Lnb represents a rare earth element different from Lna; hereafter the same shall apply), two (or more) rare earth elements (Ln) may be present in one nanoparticle. When two (or more) rare earth elements are present in one nanoparticle, the kinds and ratio (mole fraction) of the rare earth elements are appropriately determined in accordance with required characteristics and the purposes of use. For example, when the purpose of use of a dispersed nanoparticle is for upconversion luminescence, it is preferable to include erbium (Er) or thulium (Tm) in an amount of 10% or less (mole fraction; hereinafter the same shall apply) and ytterbium (Yb) as a sensitizer in an amount of 10% or less. In addition, in order to use nanoparticles as a contrast medium, Gd is preferably included in an amount of 40% or more.

Meanwhile, the halogen element (X) is not particularly limited and examples of the halogen element include Cl (chlorine), Br (bromine), and I (iodine).

Examples of the rare earth oxide nanoparticle include Y2O3, YPO4, La2O3, Yb2O3, and Gd2O3.

The amount of the nanoparticle used in the present invention is not particularly limited and can be appropriately determined in accordance with the kind, required characteristics, and the like of the nanoparticle. For example, the amount of the nanoparticle is from 0.5 to 10.0% by mass (preferably from 0.5 to 5.0% by mass) with respect to the total amount of the complex and a surface altering agent-containing liquid.

(Solid Material)

In the complex used in the present invention, the solid material present around the nanoparticle is not particularly limited as long as the solid material can be dissolved in a solvent (for example, water) used in the present dispersing step.

As used herein, the phrase "dissolved in a solvent" means to have a solubility of 1 part by mass or more per 100 parts by mass of the solvent (25° C.).

A solid material that can be suitably used is a metal salt that generates a metal ion when dissolved in a solvent such as water.

The "metal" in the metal ion and the metal salt can be any of alkali metals (e.g. Li, Na, K, Rb, and Cs), alkaline earth metals (e.g. Mg, Ca, Ba, and Sr), transition metals (e.g. Ti, V, Cr, Mn, Fe, Co, Ni, Cu, Zn, Zr, Nb, Mo, Pb, Ag, Hf, Ta, W, Pt, and Au), rare earth metals (rare earth elements) (e.g. Sc, Y, La, Ce, Pr, Nd, Pm, Sm, Eu, Gd, Tb, Dy, Ho, Er, Tm, Yb, and Lu).

The metal salt may include a single metal element or two or more metal elements.

In addition, examples of the metal salt include a metal hydrochloride, a metal sulfate, a metal carbonate, a metal phosphate, and a metal nitrate.

Next, specific embodiments of the complex in the present invention will be described.

First Embodiment of Complex

Figure 1:
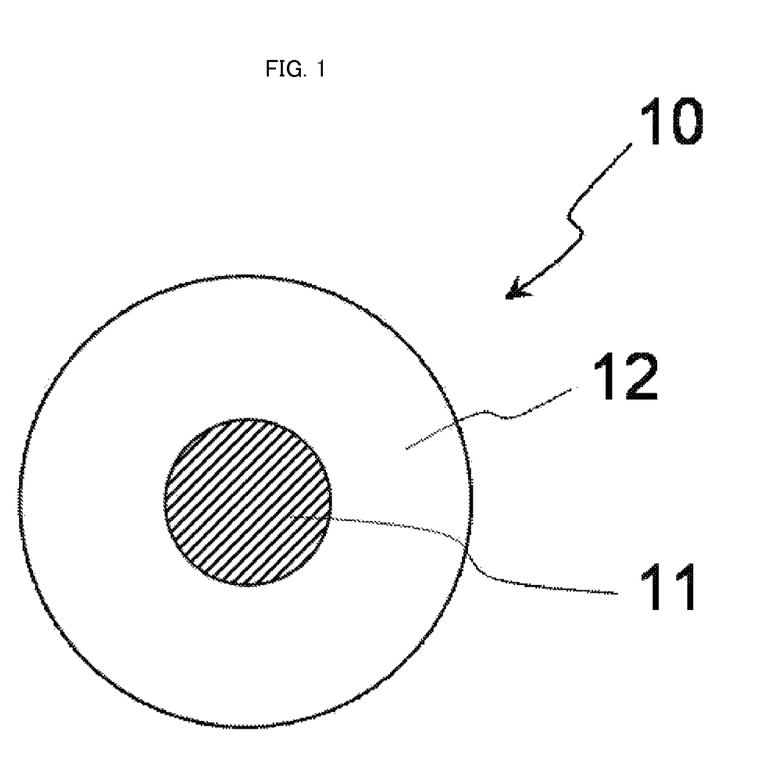
FIG. 1 is a schematic cross-sectional view conceptually illustrating a first embodiment of a complex in the present invention.

FIG. 1 is a schematic cross-sectional view conceptually illustrating a cross-section of a complex particle having a core-shell structure, which is a first embodiment of the complex in the present invention.

As illustrated in FIG. 1, a complex particle 10 has a structure in which a nanoparticle 11 as a core is covered with a solid material 12 as a shell.

In FIG. 1, the complex particle 10 and the nanoparticle 11 are true-spherical. However, the complex particle and the nanoparticle in the present invention may be particles each having a shape other than the true spherical shape (e.g. formless particles).

Second Embodiment of Complex

Figure 2:
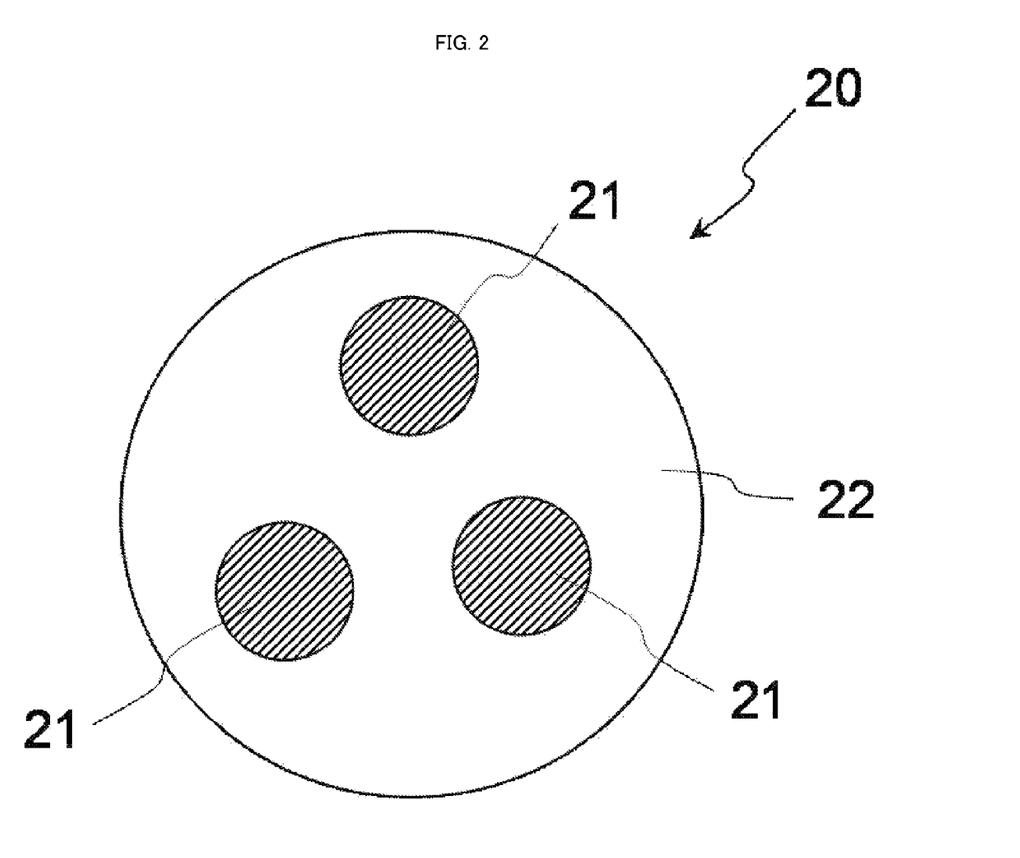
FIG. 2 is a schematic cross-sectional view conceptually illustrating a second embodiment of a complex in the present invention.

FIG. 2 is a schematic cross-sectional view conceptually illustrating a cross-section of a complex particle that is a second embodiment of the complex in the present invention.

As illustrated in FIG. 2, a complex particle 20 has a structure in which plural nanoparticles 21 are present in a solid material 22 as a matrix.

In FIG. 2, the complex particle 20 and the nanoparticle 21 are true-spherical. However, the complex particle and the nanoparticle in the present invention may be particles each having a shape other than the true spherical shape (e.g. formless particles). Additionally, in FIG. 2, three nanoparticles 21 are included in the complex particle 20, but the number of nanoparticles included in a single complex particle is not particularly limited.

A specific example of the complex particle 20 is an LnOX-LnX3 complex particle in which the nanoparticles 21 are LnOX (Ln represents a rare earth element and X represents a halogen element) nanoparticles and the solid material 22 is LnX3 (Ln represents a rare earth element and X represents a halogen element).

As a method of producing the LnOX-LnX3 complex particle as an example of the complex particle 20, for example, a method can be suitably used that is described in paragraphs 0023 to 0048 of JP-A No. 2009-138081.

Specifically, the complex particle can be suitably produced by a production method including a first heating treatment in which a rare earth halide hydrate LnX3.nH2O (Ln represents a rare earth element, X represents a halogen, and n represents an integer of one to seven) is heated at 100 to 350° C. for one hour or more to obtain a temporally sintered body and a second heating treatment in which the temporally sintered body obtained in the first heating treatment is heated at 400° C. or more for one hour or more (the method will be hereinafter referred to also as "production method A").

Herein, the heating in the first heating treatment is preferably performed in a gradual manner.

In the production method A, the rare earth halide hydrate (LnX3.nH2O) as a starting material can be easily obtained by dissolving a corresponding rare earth halide (LnX3) in water such as pure water. In addition, although the shape of the starting material is not particularly limited, the material preferably has a particulate shape in order to allow an LnOX nanoparticle to be efficiently precipitated in a complex particle, and a crystal particle size of the rare earth halide hydrate (LnX3.nH2O) is preferably set to a micrometer size (approximately one to 20 μm) in advance. As a method of setting the crystal particle size of the hydrate to a micrometer size, a solution of the starting material dissolved in a solvent such as water is rapidly heated at a temperature of from about 100 to 200° C. to rapidly evaporate only the solvent and dry the residue so as to easily obtain a hydrate having a micrometer size.

In addition, in the production method A, the rare earth halide hydrate (LnX3.nH2O) used as the starting material may be one kind alone or a combination of two (or more) kinds such as LnaX3.nH2O and LnbX3.nH2O. The latter case can provide a complex particle containing two (or more) rare earth elements, such as a LnaLnbOX-LnaLnbX3 complex particle (e.g. an Lna:LnbOCl-Lna:LnbCl3 complex). Further, there can be obtained a nanoparticle dispersion liquid in which LnaLnbOX (Lna:LnbOCl) containing two (or more) rare earth elements is included in the nanoparticle.

The production method A may use, as the rare earth halide hydrate (LnX3.nH2O), a rare earth halide hydrate LnaLnbX3.nH2O containing two Ln (rare earth elements) or a rare earth halide hydrate containing three or more rare earth elements.

In the production method A, the rare earth halide hydrate (LnX3.nH2O) as the starting material is subjected to two-step heat treatments.

First, heating treatment is performed at 100 to 350° C. for one hour or more (a first heating treatment). Heating under the above conditions produces a temporally sintered body in which anhydrous LnX3 is generated by reaction of the following Formula (I) on a surface of a particle obtained, while LnX3.H₂O in an amount corresponding to heating temperature and heating time remains inside the particle.

LnX3.H2O-->LnX3H2O            Formula (I)

Herein, since the heating temperature (retention temperature) in the first heating treatment is 100° C. or higher, reaction can be more effectively promoted, whereby a desired amount of anhydrous LnX3 can be more easily generated.

In addition, in the first heating treatment, using a heating temperature of 350° C. or lower can further suppress a phenomenon in which much of the rare earth halide hydrate (LnX3.nH2O) becomes LnOX at the step of the first heating treatment (a phenomenon in which anhydrous LnX3 serving as a matrix is reduced).

When the heating time (retention time) is one hour or more, reaction can be more effectively promoted, thereby further facilitating the generation of a desired amount of anhydrous LnX3.

The heating time (retention time) is preferably from one to 100 hours, more preferably from one to 50 hours, and particularly preferably from one to five hours. In addition, a temperature increase rate in the first heating treatment is not particularly limited and it is sufficient for the temperature increase rate to be about from 50 to 100° C./hour.

The first heating treatment may be performed gradually at temperatures from 100 to 350° C. Gradual heating can ensure the promotion of reaction. In addition, by regulating a degree of detachment of water from the hydrate crystal, a volume of residual hydrate is regulated, whereby a particle size of an LnOCl particle obtained by self-hydrolysis can be regulated.

A temperature difference between the respective steps is preferably from 20 to 80° C. and particularly preferably from 30 to 60° C. Additionally, a retention time in each step is preferably from one to 10 hours and particularly preferably from one to five hours in each step.

Next, as the second heating treatment, the temporally sintered body obtained by the first heating treatment is heated at a temperature of 400° C. or higher for one hour or more. By heating at a higher temperature than the first heating treatment, due to a reaction of the following Formula (II), the LnX3.nH2O remaining inside the temporally sintered body obtained by the first heating treatment changes to LnOX. As a result, there can be obtained an LnOX-LnX3 complex particle having a structure in which an anhydrous LnOX nanoparticle having an average particle size of nanometer size is present in the anhydrous LnX3 as a matrix.

Formula (II)

By setting the heating temperature (retention temperature) in the second heating treatment to 400° C. or higher, reaction can be further promoted, whereby a desired amount of anhydrous LnOX can be easily obtained.

The higher the heating temperature, the further the reaction proceeds. In order to obtain an LnOX nanoparticle having a nanometer size, it is sufficient for the heating temperature to be approximately from 400 to 500° C.

When the heating time (retention time) in the second heating treatment is one hour or more, reaction can be more effectively promoted, thereby further facilitating the generation of a desired amount of anhydrous LnOX.

As the heating time in the second heating treatment becomes longer, there is produced an LnOX-LnX3 complex particle containing LnOX generated in an amount corresponding to the length of the time. However, the heating time is preferably approximately from one to five hours, and particularly preferably from one to two hours.

In addition, a temperature increase rate in the second heating treatment is not particularly limited. However, the larger the temperature increase rate in the second heating treatment, the further the growth of crystal can be suppressed, whereby an average particle size of a nanoparticle included in the complex particle can be made smaller. Accordingly, regulation of the temperature increase rate may enable to regulate an average particle size of nanoparticles included in a nanoparticle dispersion liquid finally obtained. The temperature increase rate is preferably about from 50 to 100° C./hour.

In the first heating treatment and the second heating treatment described above, in order to produce the complex particle efficiently, it is preferable to use a vacuum atmosphere or an atmosphere of an inert gas such as nitrogen or argon. In addition, a heating means used in the first and the second heating treatments can be a known heating means, such as an electric furnace.

The LnOX-LnX3 complex particle obtained by the two-step heating treatments has a particle size of from one to 1000 μm and has a structure in which slightly soluble nanoparticles (LnOX) having an average particle size of from one to 800 nm are present in innumerable numbers in a soluble host (LnX3) as a matrix.

In the obtained complex particle, both the LnOX nanoparticles that are rare earth halide hydrate nanoparticles and the LnX3 that is a rare earth halide are thought to be crystalline. In addition, in a single complex, innumerable LnOX nanoparticles are thought to be present in a mono-dispersed state in the LnX3 as the matrix. For example, when an LnX3 particle as a matrix has a size of about one μm, a surface of the particle becomes pure LnX3 and a water molecule remains in a part of the inside of the particle and causes self-hydrolyzation, so as to form the particle having a volume which is smaller than one μm, accounting for subtraction of the pure LnX3. Depending on the degree of the heating treatments, a degree of water released from the particle surface varies. Thus, heating for a certain length of time increases pure LnX3 in an amount corresponding to the length of time but reduces LnX3.H2O, with the result that a volume of LnOX generated by the self-hydrolysis of LnX3.H2O, namely, a particle size of the LnOX, becomes small.

Figure 3:
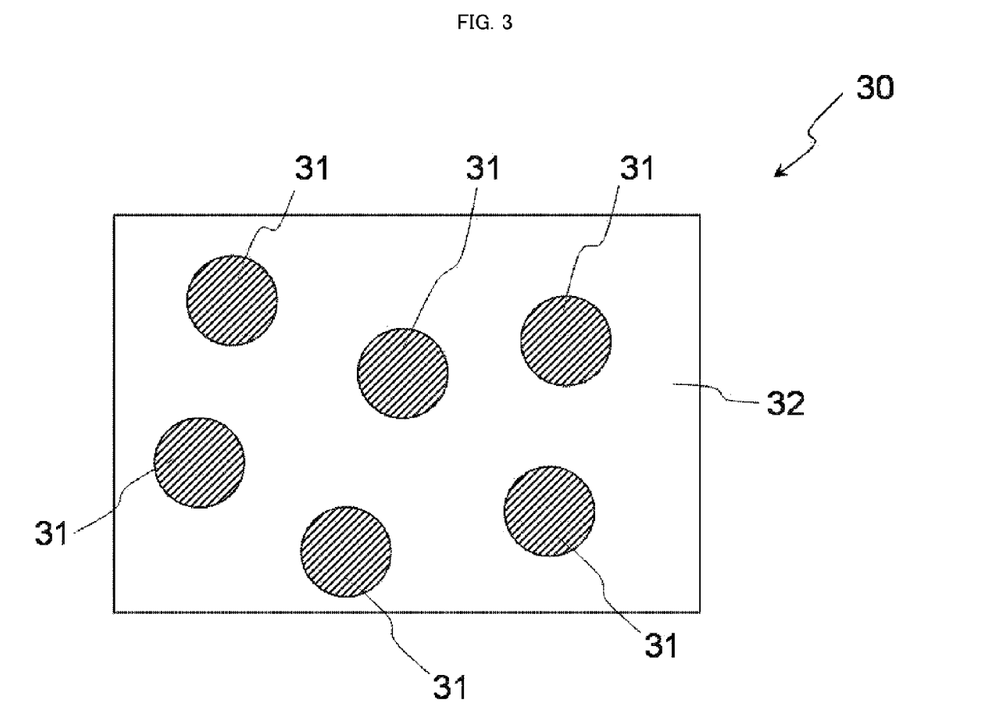
FIG. 3 is a schematic cross-sectional view conceptually illustrating a third embodiment of a complex in the present invention.

FIG. 3 is a schematic cross-sectional view conceptually illustrating a cross-section of a complex aggregate, which is a third embodiment of a complex in the present invention.

As illustrated in FIG. 3, a complex aggregate 30 has a structure in which plural nanoparticles 31 are present in a solid material 32 as a matrix.

In FIG. 3, the nanoparticles 31 are true-spherical, but nanoparticles used in the present invention may be particles having a shape other than the true spherical shape (for example, formless particles). In addition, in FIG. 3, the complex aggregate 30 is an aggregate which has a rectangular cross-section, but the shape of a complex aggregate used in the present invention is not particularly limited. The complex aggregate in the present invention may have any shape, such as a cube, rectangular parallelepiped, sphere, or cylinder. Additionally, in FIG. 3, the complex aggregate 30 includes six nanoparticles 31, but the number of nanoparticles included in the complex aggregate is not particularly limited.

Specific examples of the complex aggregate 30 include an example in which the nanoparticles 31 are rare earth oxide (for example, Y2O3) nanoparticles and the solid material 32 is a metal salt (for example, K3PO4).

As a method of producing a Y2O3-K3PO4 complex aggregate as the one example of the complex aggregate 30, a method can be suitably used that is described in Journal of Physics: Conference Series 191 (2009): 012003-1 012003-7 (the method will be hereinafter referred to also as "production method B").

The production method B includes an aqueous solution preparing step of preparing an aqueous solution including at least one of Y(OH)$_3$ and Y(OH)CO3 and K3PO4, a drying step of drying the obtained aqueous solution to remove water as a solvent from the aqueous solution so as to obtain an aggregate, and a burning step of burning the aggregate obtained by the drying step to obtain Y2O3 from the at least one of Y(OH)3 and Y(OH)CO3 in the aggregate.

Herein, a burning temperature in the burning step is preferably from 600 to 1500° C.

In addition, a burning time is preferably from 0.5 to 10 hours.

Surface Altering Agent-Containing Liquid

A surface altering agent-containing liquid used in the present invention includes a surface altering agent for altering the surface of the nanoparticle and a solvent for dissolving the solid material and has a viscosity of 1.10 mPa·s or more at 25° C.

(Surface Altering Agent)

The surface altering agent-containing liquid includes at least one surface altering agent for altering the surface of the nanoparticle. The surface altering agent may be dissolved or dispersed in a solvent.

The surface altering agent may be a surfactant, a water soluble polymer, or a polymer dispersant described below.

The surfactant is not particularly limited and examples of the surfactant include cationic surfactants, anionic surfactants, nonionic surfactants, amphoteric surfactants, silicone-based surfactants, and fluorine-based surfactants.

Examples of the water soluble polymer usable include polyethylene glycol, poly(meth)acrylic acid, and phospholipid.

Any one of these may be used alone or two or more thereof may be used in combination.

In the present specification, the term "(meth)acrylic acid" represents acrylic acid or methacrylic acid.

Polymer Dispersant

From the viewpoint of dispersing by steric repulsion of polymer, the surface altering agent is preferably a polymer dispersant that alters the surface of the nanoparticle by modifying the surface of the nanoparticle.

A polymer dispersant that can be suitably used is a polymer dispersant (a polymer compound) that includes, in one molecule thereof, an adsorption site for adsorption onto the nanoparticle surface and a steric repulsion site. As such a polymer dispersant, a block copolymer or a graft copolymer (particularly preferred is a block copolymer) including an adsorption site and a steric repulsion site is suitable.

The adsorption site is not particularly limited as long as the site can adsorb onto a nanoparticle surface.

The adsorption site is preferably a site made of a polymer obtained by polymerization of a vinyl monomer containing an acid group (such as a carboxyl group), a salt of the polymer, or an ionomer of the polymer.

An example of the adsorption site is a poly(meth)acrylic acid site.

A number average molecular weight of the adsorption site is preferably from 100 to 15000, more preferably from 100 to 10000, still more preferably from 1000 to 5000, and particularly preferably from 2000 to 4000.

The steric repulsion site is not particularly limited as long as the site has a function of preventing aggregation between nanoparticles by steric repulsion.

From the viewpoint of dispersing property, the steric repulsion site preferably has affinity to the solvent.

Examples of the steric repulsion site include a polyethylene glycol site and a polyethylene imine site.

Of these, from the viewpoint of biocompatibility and the like, the steric repulsion site is preferably a polyethylene glycol site.

A number average molecular weight of the steric repulsion site is preferably from 1000 to 15000, more preferably from 3000 to 10000, still more preferably from 3000 to 7000, and particularly preferably from 4000 to 6000.

The polymer dispersant is preferably a polymer dispersant (a polymer compound) that includes, in one molecule thereof, a poly(meth)acrylic acid site as the adsorption site and a polyethylene glycol site as the steric repulsion site.

The polymer dispersant is particularly preferably a polymer dispersant (a polymer compound) that includes, in one molecule thereof, a poly(meth)acrylic acid site having a number average molecular weight of from 100 to 15000 as the adsorption site and a polyethylene glycol site having a number average molecular weight of from 1000 to 15000 as the steric repulsion site.

An amount of the surface altering agent in the present invention is not particularly limited and can be appropriately selected in accordance with an amount of nanoparticles for which surface alteration is to be performed. The amount of the surface altering agent can be, for example, from 0.01 to 1.0% by mass with respect to a total amount of the complex and the surface altering agent-containing liquid.

(Solvent)

As the solvent, water, alcohol such as ethanol, acetone, tetrahydrofuran, dimethylhydrofuran, or chloroform is suitably used. The solvent may be a solvent made of a single component or a mixture solvent made of two or more components.

The solvent preferably includes at least water from the viewpoint of handleability and biocompatibility.

(Thickener)

The surface altering agent-containing liquid in the present invention preferably includes at least one thickener. By including at least one thickener, the viscosity of the surface altering agent-containing liquid at 25° C. can more easily be set to 1.10 mPa·s or more.

The thickener is not particularly limited and examples of thickeners usable include polyalkylene glycol (polyethylene glycol, polypropylene glycol, etc.), polyvinyl alcohol, and polyethylene imine.

The thickener is, from the viewpoint of biocompatibility and the like, preferably polyalkylene glycol, and more preferably polyethylene glycol.

A number average molecular weight of the polyethylene glycol is preferably from 1000 to 15000, more preferably from 3000 to 10000, still more preferably from 4000 to 8000, and particularly preferably from 5000 to 7000.

An amount of the thickener is not particularly limited. However, from the viewpoint of achieving both of the suppression of nanoparticle aggregation and the alteration of the nanoparticle surface, the amount of the thickener is preferably from one to 50% by mass, more preferably from one to 40% by mass, and particularly preferably from one to 30% by mass, with respect to a total amount of the surface altering agent-containing liquid.

In addition, the surface altering agent-containing liquid may include a buffer.

Specific examples of the buffer include trishydroxymethylaminomethane ("TRIS"), 4-(2-hydroxyethyl-1-piperazine ethane sulfonic acid ("HEPES"), boric acid, hydrochloric acid, sodium acetate, and sodium hydroxide.

As the buffer, a combination of two or more buffers such as tris-hydrochloric acid (Tris-HCl), HEPES-NaOH, boric acid-sodium hydroxide (borate-NaOH), and the like may be used.

Further, the surface altering agent-containing liquid may include an ionic substance.

When the surface altering agent-containing liquid includes an ionic substance, the effect of suppressing nanoparticle aggregation in the presence of an ion can be more effectively obtained.

Examples of the ionic substance include the above-mentioned buffers and various metal salts.

The surface altering agent-containing liquid may include other components as needed.

EXAMPLES

Hereinafter, the present invention will be described in more detail with reference to Examples, but the present invention is not limited to these Examples. In addition, the term "room temperature" means 25° C., and viscosity means a viscosity at 25° C.

Experimental Example 1

Production of Complex Particle

Using a method described in paragraphs 0054 to 0059 in JP-A No. 2009-138081, an Er:LaOCl-Er:LaCl3 complex particle was produced that had a structure in which Er:LaOCl nanoparticles were present in a matrix made of Er:LaCl3.

Details of the production will be given below.

First, $LaCl_3 \cdot 6H_2O$ was dissolved in water to prepare a $LaCl_3$ aqueous solution ($LaCl_3$ concentration: 1.345 mol/L).

Next, $ErCl_3 \cdot 6H_2O$ was dissolved in water to prepare an $ErCl_3$ aqueous solution ($ErCl_3$ concentration: 0.873 mol/L).

The LaCl3 aqueous solution and the ErCl3 aqueous solution obtained above were weighed out in amounts to provide a mole ratio of LaCl3/ErCl3 of 99/1 and mixed together to obtain a mixture solution.

The obtained mixture solution was heated at 80° C. for three hours to obtain a particulate hydrate (La0.99Er0.01Cl3.6H2O).

The obtained hydrate was placed in a refractory boat made of alumina and heated in an electric furnace with a nitrogen gas atmosphere at a temperature increase rate of 50° C./min, where the temperature was increased from room temperature to each temperature of 120° C., 180° C., 240° C., and 300° C. and the hydrate was retained for three hours at each of the temperatures to obtain a temporally sintered body in which anhydrous La0.99Er0.01Cl3 was present outside particles and La0.99Er0.01Cl3.H2O was present inside the particles.

The obtained temporally sintered body was heated at 400° C. for three hours in the above electric furnace with a nitrogen gas atmosphere, whereby the La0.99Er0.01Cl3.H2O inside the particles became La0.99Er0.0OCl to obtain an Er:LaOCl-Er:LaCl3 complex particle (average particle size: one to 1000 μm) as a sintered body.

The obtained sintered body was pulverized in an agate mortar and then crystal phase analysis was performed by a powder X-ray diffraction apparatus (XRD-6100: manufactured by Shimadzu Corporation). As a result, the X-ray diffraction pattern indicated the formation of an LaCl3 phase and an LaOCl phase, so that the sintered body was confirmed to be an Er:LaOCl-Er:LaCl3 complex particle having a structure in which Er:LaOCl nanoparticles were present in a matrix made of Er:LaCl3.

In addition, using a transmission electron microscope (LEO 922: manufactured by Carl Zeiss Co. Ltd.), a scanning electron microscope (S4200: manufactured by Hitachi High-Technologies Corporation), and dynamic light scattering (LB-550: manufactured by Horiba Inc.), observation was performed to observe that the Er:LaOCl nanoparticles in the complex particle had a particle size of 20 nm.

Preparation of Dispersion Liquid and Measurement of Dispersed Particle Size

Using the Er:LaOCl-Er:LaCl3 complex particle obtained above, dispersion liquids (samples a to l as below) were prepared.

Samples d to l are Examples of the present invention and samples a to c are Comparative Examples.

In the samples a to l, the following compounds were used as "PEG-PAAc" and "PEG".

PEG-PAAc: polyethylene glycol-polyacrylic acid block copolymer (number average molecular weight of PEG: 5000; number average molecular weight of PAAc: 3200) (manufactured by Polymer Source Inc).

PEG: polyethylene glycol (number average molecular weight: 6000) (manufactured by Kanto Chemical Co., Inc).

(Preparation of Sample a)

To 10 mmol/L TRIS buffer aqueous solution (viscosity is indicated in Table 1) was added the above Er:LaOCl-Er:LaCl3 complex particle in an amount corresponding to a concentration of 5.0% by mass and then the mixture was stirred for one hour at a liquid temperature of 25° C. to obtain a sample a.

(Preparation of Sample b)

A sample b was prepared in the same manner as the preparation of the sample a except that the TRIS buffer aqueous solution in the preparation of the sample a was replaced by an aqueous solution (PEG-PAAc concentration: 0.05% by mass) (viscosity is indicated in Table 1) obtained by adding PEG-PAAc to the TRIS buffer aqueous solution.

(Preparation of Sample c)

A sample c was prepared in the same manner as the preparation of the sample a except that the TRIS buffer aqueous solution in the preparation of the sample a was replaced by an aqueous solution (PEG-PAAc concentration: 0.05% by mass; PEG concentration: 0.5% by mass) (viscosity is indicated in Table 1) obtained by adding PEG-PAAc and PEG to the TRIS buffer aqueous solution.

(Preparation of Sample d)

A sample d was prepared in the same manner as the preparation of the sample a except that the TRIS buffer aqueous solution in the preparation of the sample a was replaced by an aqueous solution (PEG-PAAc concentration: 0.05% by mass; PEG concentration: 1.0% by mass) (viscosity is indicated in Table 1) obtained by adding PEG-PAAc and PEG to the TRIS buffer aqueous solution.

(Preparation of Sample e)

A sample e was prepared in the same manner as the preparation of the sample a except that the TRIS buffer aqueous solution in the preparation of the sample a was replaced by an aqueous solution (PEG-PAAc concentration: 0.05% by mass; PEG concentration: 2.0% by mass) (viscosity is indicated in Table 1) obtained by adding PEG-PAAc and PEG to the TRIS buffer aqueous solution.

(Preparation of Sample f)

A sample f was prepared in the same manner as the preparation of the sample a except that the TRIS buffer aqueous solution in the preparation of the sample a was replaced by an aqueous solution (PEG-PAAc concentration: 0.05% by mass; PEG concentration: 3.0% by mass) (viscosity measurement was omitted) obtained by adding PEG-PAAc and PEG to the TRIS buffer aqueous solution.

(Preparation of Sample g)

A sample g was prepared in the same manner as the preparation of the sample a except that the TRIS buffer aqueous solution in the preparation of the sample a was replaced by an aqueous solution (PEG-PAAc concentration: 0.05% by mass; PEG concentration: 4.0% by mass) (viscosity is indicated in Table 1) obtained by adding PEG-PAAc and PEG to the TRIS buffer aqueous solution.

(Preparation of Sample h)

A sample h was prepared in the same manner as the preparation of the sample a except that the TRIS buffer aqueous solution in the preparation of the sample a was replaced by an aqueous solution (PEG-PAAc concentration: 0.05% by mass; PEG concentration: 5.0% by mass) (viscosity is indicated in Table 1) obtained by adding PEG-PAAc and PEG to the TRIS buffer aqueous solution.

(Preparation of Sample i)

A sample i was prepared in the same manner as the preparation of the sample a except that the TRIS buffer aqueous solution in the preparation of the sample a was replaced by an aqueous solution (PEG-PAAc concentration: 0.05% by mass; PEG concentration: 10.0% by mass) (viscosity is indicated in Table 1) obtained by adding PEG-PAAc and PEG to the TRIS buffer aqueous solution.

(Preparation of Sample j)

A sample j was prepared in the same manner as the preparation of the sample a except that the TRIS buffer aqueous solution in the preparation of the sample a was replaced by an aqueous solution (PEG-PAAc concentration: 0.05% by mass; PEG concentration: 15.0% by mass) (viscosity is indicated in Table 1) obtained by adding PEG-PAAc and PEG to the TRIS buffer aqueous solution.

(Preparation of Sample k)

A sample k was prepared in the same manner as the preparation of the sample a except that the TRIS buffer aqueous solution in the preparation of the sample a was replaced by an aqueous solution (PEG-PAAc concentration: 0.05% by mass; PEG concentration: 20.0% by mass) (viscosity is indicated in Table 1) obtained by adding PEG-PAAc and PEG to the TRIS buffer aqueous solution.

(Preparation of Sample l)

A sample l was prepared in the same manner as the preparation of the sample a except that the TRIS buffer aqueous solution in the preparation of the sample a was replaced by an aqueous solution (PEG-PAAc concentration: 0.05% by mass; PEG concentration: 30.0% by mass) (viscosity is indicated in Table 1) obtained by adding PEG-PAAc and PEG to the TRIS buffer aqueous solution.

(Measurement of Dispersed Particle Size)

Regarding each of the samples a to l, measurement of the dispersed particle size was performed by a dynamic light scattering method (DLS) using a dynamic light scattering particle size distribution measuring apparatus (LB-550: manufactured by Horiba Inc).

Measurement results are indicated in Table 1.

In Table 1, the sample names are listed in the column of "Sample".

In Table 1, viscosities (unit: mPa·s) of the respective aqueous solutions before adding the Er:LaOCl-Er:LaCl3 complex particle are listed in the column of "Viscosity (mPa·s)".

In Table 1, dispersed particle sizes (unit: nm) of the respective samples are listed in the column of "Particle Size (nm)".

Table 1

As indicated in Table 1, the samples d to l had dispersed particle sizes (Particle Size (nm)) of about 10 nm and resulted in nanoparticle dispersion liquids in which aggregation of Er:LaOCl nanoparticles was suppressed and the Er:LaOCl nanoparticles were highly dispersed.

Meanwhile, the samples a to c had dispersed particle sizes of 220 nm or more and were observed to have caused the aggregation of Er:LaOCl nanoparticles and have larger dispersed particle sizes comparing to those of the samples d to l.

(Evaluation of Dispersion Stability)

The sample b was washed and freeze-dried to obtain an Er:LaOCl-Er:LaCl3 complex particle modified with PEG-PAAc (the complex particle will be hereinafter referred to as "particle b").

An Er:LaOCl-Er:LaCl3 complex particle modified with PEG-PAAc (hereinafter referred to as "particle c") was obtained in the same manner as the production of the particle b except that the sample b in the production of the particle b was changed to the sample c.

An Er:LaOCl-Er:LaCl3 complex particle modified with PEG-PAAc (hereinafter referred to as "particle d") was obtained in the same manner as the production of the particle b except that the sample b in the production of the particle b was changed to the sample d.

An Er:LaOCl-Er:LaCl3 complex particle modified with PEG-PAAc (hereinafter referred to as "particle e") was obtained in the same manner as the production of the particle b except that the sample b in the production of the particle b was changed to the sample e.

An Er:LaOCl-Er:LaCl3 complex particle modified with PEG-PAAc (hereinafter referred to as "particle k") was obtained in the same manner as the production of the particle b except that the sample b in the production of the particle b was changed to the sample k.

An Er:LaOCl-Er:LaCl3 complex particle modified with PEG-PAAc (hereinafter referred to as "particle l") was obtained in the same manner as the production of the particle b except that the sample b in the production of the particle b was changed to the sample l.

An Er:LaOCl-Er:LaCl3 complex particle modified with PEG-PAAc (hereinafter referred to as "particle a") was obtained in the same manner as the production of the particle b except that the sample b in the production of the particle b was changed to the sample a.

Next, the particle b was added in an amount corresponding to a concentration of 1 mg/mL to a HEPES buffer aqueous solution (10 mM HEPES, pH 7.4, 150 mM NaCl) and dispersed at 25° C. for one hour to obtain a dispersion liquid. Regarding the obtained dispersion liquid, an absorbance at a wavelength of 550 nm was measured using a UV-visible spectrophotometer (V630 manufactured by JASCO Corporation). In addition, an absorbance at a time of completion of the dispersing was set as a turbidity of 100% to observe changes in turbidity with the passage of time.

Additionally, regarding the particles c, d, e, k, l, and a, each dispersion solution was prepared in the same manner as the particle b to observe changes in turbidity with the passage of time.

Figure 4:
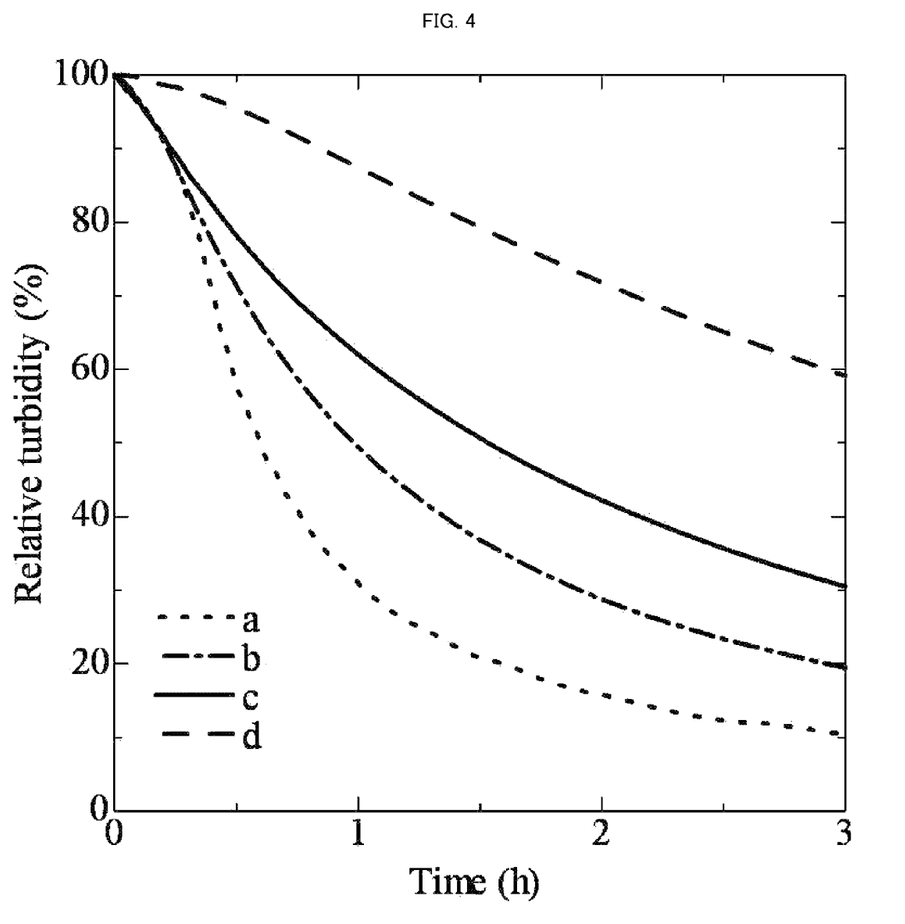
FIG. 4 is a graph indicating a relationship between elapsed time and turbidity after completion of dispersing of particles a to d in Experimental Example 1 of the present invention.
Figure 5:
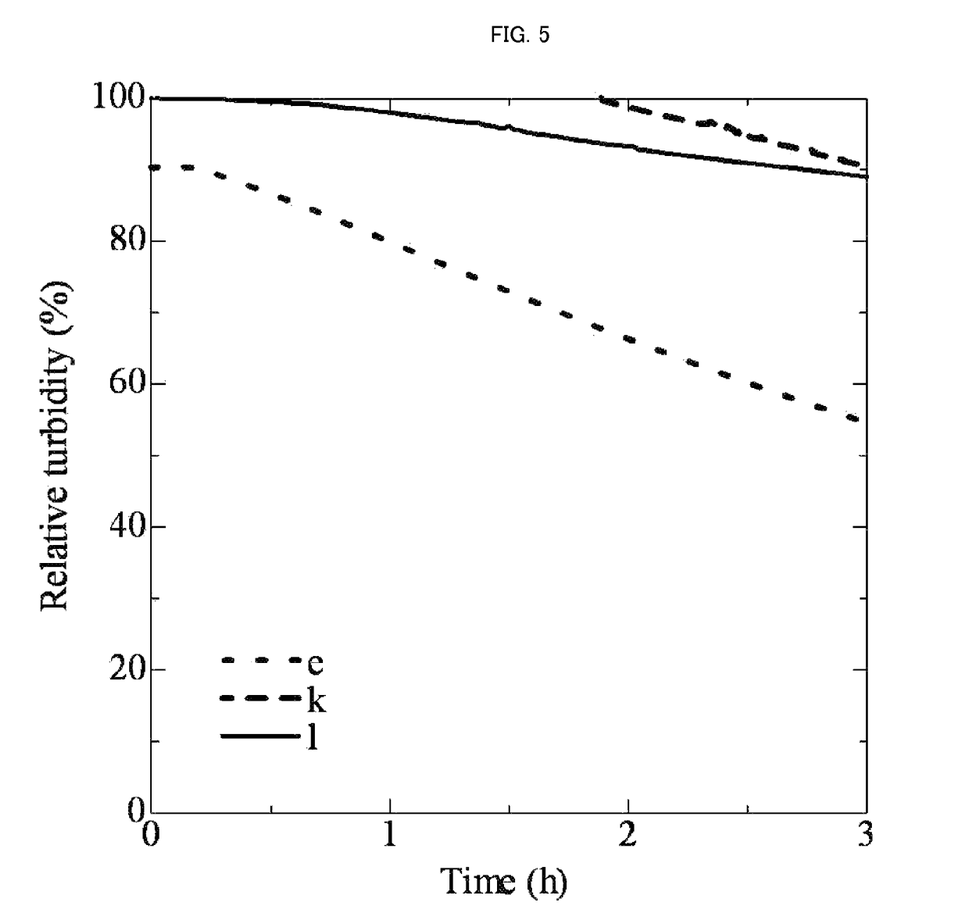
FIG. 5 is a graph indicating a relationship between elapsed time and turbidity after completion of dispersing of particles e, k, and l in Experimental Example 1 of the present invention.

FIGS. 4 and 5 indicate changes in turbidity with time in the respective dispersion liquids.

In FIGS. 4 and 5, the horizontal axis (Time (h)) represents elapsed time (unit: hour) after the completion of the dispersing, and the vertical axis (Relative turbidity (%)) represents the turbidity (unit: %) of each dispersion liquid.

As indicated in FIGS. 4 and 5, the dispersion liquid of the particle d ("d" in FIG. 4), the dispersion liquid of the particle e ("e" in FIG. 5), the dispersion liquid of the particle k ("k" in FIG. 5), and the dispersion liquid of the particle l ("l" in FIG. 5) showed more moderate turbidity reduction and were thus found to have more excellent dispersion stability than the dispersion liquid of the particle a ("a" in FIG. 4), the dispersion liquid of the particle b ("b" in FIG. 4), and the dispersion liquid of the particle c ("c" in FIG. 4).

The reason for this is thought to be that, since the particle sizes of the particles d, e, k, and l were smaller than those of the particles a, b, and c, sedimentation velocities of the particles were reduced.

All documents, patent applications, and technical standards described in the present specification are incorporated herein by reference to the same extent as if each individual document, patent application, and technical standard were specifically and individually indicated to be incorporated by reference.

What is claimed is:

1. A method of producing a nanoparticle dispersion liquid, comprising:
    altering a surface of a nanoparticle in the presence of an ion by contacting a complex that includes the nanoparticle and a solid material present around the nanoparticle with a surface altering agent-containing liquid that includes a surface altering agent for altering the surface of the nanoparticle and a solvent for dissolving the solid material; and
    the nanoparticle, the surface of which has been altered by the contacting, in the solvent,
    wherein the surface altering agent-containing liquid has a viscosity of 1.10 mPa·s or more at 25° C.

2. The method of producing a nanoparticle dispersion liquid according to claim 1, wherein:
    the solid material is a metal salt;
    the solvent is water;
    the ion is a metal ion generated by dissolution of the metal salt; and
    the surface altering agent is a polymer dispersant that alters the surface of the nanoparticle by modifying the surface of the nanoparticle.

3. The method of producing a nanoparticle dispersion liquid according to claim 1, wherein:
the nanoparticle is a ceramic nanoparticle;
the solid material is a metal salt;
the solvent is water;
the ion is a metal ion generated by dissolution of the metal salt; and
the surface altering agent is a polymer dispersant that alters a surface of the ceramic nanoparticle by modifying the surface of the ceramic nanoparticle.

4. The method of producing a nanoparticle dispersion liquid according to claim 1, wherein a viscosity of the surface altering agent-containing liquid at 25° C. is from 1.10 mPa·s to 40 mPa·s.

5. The method of producing a nanoparticle dispersion liquid according to claim 2, wherein a viscosity of the surface altering agent-containing liquid at 25° C. is from 1.10 mPa·s to 40 mPa·s.

6. The method of producing a nanoparticle dispersion liquid according to claim 3, wherein a viscosity of the surface altering agent-containing liquid at 25° C. is from 1.10 mPa·s to 40 mPa·s.

7. The method of producing a nanoparticle dispersion liquid according to claim 1, wherein the surface altering agent-containing liquid further includes a thickener.

8. The method of producing a nanoparticle dispersion liquid according to claim 2, wherein the surface altering agent-containing liquid further includes a thickener.

9. The method of producing a nanoparticle dispersion liquid according to claim 3, wherein the surface altering agent-containing liquid further includes a thickener.

10. The method of producing a nanoparticle dispersion liquid according to claim 2, wherein the polymer dispersant includes, in one molecule thereof, an adsorption site for adsorption onto the surface of the nanoparticle and a steric repulsion site.

11. The method of producing a nanoparticle dispersion liquid according to claim 3, wherein the polymer includes, in one molecule thereof, an adsorption site for adsorption onto the surface of the ceramic nanoparticle and a steric repulsion site.

12. The method of producing a nanoparticle dispersion liquid according to claim 2, wherein the polymer dispersant includes, in one molecule thereof, a poly(meth)acrylic acid site as an adsorption site for adsorption onto the surface of the nanoparticle and a polyethylene glycol site as a steric repulsion site.

13. The method of producing a nanoparticle dispersion liquid according to claim 3, wherein the polymer dispersant includes, in one molecule thereof, a poly(meth)acrylic acid site as an adsorption site for adsorption onto the surface of the ceramic nanoparticle and a polyethylene glycol site as a steric repulsion site.

14. The method of producing a nanoparticle dispersion liquid according to claim 1, wherein:
the nanoparticle is a rare earth oxychloride nanoparticle or a rare earth oxide nanoparticle;
the solid material is a rare earth salt;
the solvent is water;
the ion is a rare earth ion generated by dissolution of the rare earth salt;
the surface altering agent is a polymer dispersant that includes, in one molecule thereof, a poly(meth)acryl acid site and a polyethylene glycol site and that alters the surface of the nanoparticle by modifying the surface of the nanoparticle; and
the surface altering agent-containing liquid further includes polyethylene glycol.

* * * * *